United States Patent
Choi et al.

(10) Patent No.: US 12,456,260 B2
(45) Date of Patent: Oct. 28, 2025

(54) METHOD AND DEVICE FOR ESTIMATING LOCOMOTION IN VIRTUAL REALITY

(71) Applicant: GWANGJU INSTITUTE OF SCIENCE AND TECHNOLOGY, Gwangju (KR)

(72) Inventors: Yunho Choi, Gwangju (KR); Kyung-Joong Kim, Gwangju (KR); Ecehan Akan, Gwangju (KR); Dong Hyeok Park, Gwangju (KR); Sung Ha Lee, Gwangju (KR); Hyeon-Chang Jeon, Gwangju (KR); Isaac Han, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 250 days.

(21) Appl. No.: 18/237,459

(22) Filed: Aug. 24, 2023

(65) Prior Publication Data

US 2024/0070988 A1 Feb. 29, 2024

(30) Foreign Application Priority Data

Aug. 26, 2022 (KR) .................. 10-2022-0107945

(51) Int. Cl.
*G06T 19/00* (2011.01)
*G02B 27/00* (2006.01)
*G02B 27/01* (2006.01)

(52) U.S. Cl.
CPC .......... *G06T 19/00* (2013.01); *G02B 27/0093* (2013.01); *G02B 27/017* (2013.01)

(58) Field of Classification Search
CPC .... G06T 19/00; G02B 27/0093; G02B 27/017
See application file for complete search history.

(56) References Cited

U.S. PATENT DOCUMENTS

| 2015/0045703 A1* | 2/2015 | Strausser ................. A61H 3/00 601/35 |
| 2015/0196403 A1* | 7/2015 | Kim ......................... A61F 2/70 623/24 |

(Continued)

FOREIGN PATENT DOCUMENTS

| KR | 10-2018-0003567 A | 1/2018 | |
| KR | 20190120922 A | * 10/2019 | ............. A61B 5/112 |

(Continued)

OTHER PUBLICATIONS

Von Willich, Julius, "Podoportation: Foot-Based Locomotion in Virtual Reality", Apr. 2020, Association for Computing Machinery, pp. 1-14 (Year: 2020).*

(Continued)

*Primary Examiner* — Terrell M Robinson
(74) *Attorney, Agent, or Firm* — Hauptman Ham, LLP

(57) ABSTRACT

A method for estimating locomotion in virtual reality performed by at least one processor includes measuring a plurality of pressure points according to a user's locomotion using a high-resolution tactile sensor including a plurality of pressure sensors, extracting a plurality of footprint images including the plurality of measured pressure points, clustering the plurality of pressure points into a first set of pressure points corresponding to a left foot and a second set of pressure points corresponding to a right foot, based on the plurality of extracted footprint images, and estimating at least a portion of a locomotion direction and a locomotion speed of the user using a first cluster corresponding to the first set of pressure points and a second cluster corresponding to the second set of pressure points.

12 Claims, 9 Drawing Sheets

(56) References Cited

U.S. PATENT DOCUMENTS

| | | | | |
|---|---|---|---|---|
| 2016/0324445 A1* | 11/2016 | Kim | ............... | A61B 5/6802 |
| 2018/0259360 A1* | 9/2018 | Mullis | ............... | G01L 19/12 |
| 2020/0008712 A1* | 1/2020 | Takenaka | ............. | A61H 3/00 |
| 2021/0117013 A1* | 4/2021 | Chen | ................ | G06F 3/011 |

FOREIGN PATENT DOCUMENTS

| | | | | | | |
|---|---|---|---|---|---|---|
| KR | 20210013795 A | * | 2/2021 | ......... | A61B 5/1036 |
| KR | 20220045489 A | * | 4/2022 | ......... | A61B 5/7465 |

OTHER PUBLICATIONS

[Supportive Materials for Exception to Loss of Novelty] Yunho Choi et al., "Seamless-walk: Novel Natural Virtual Reality Locomotion Method with a High-Resolution Tactile Sensor," 2022 IEEE Conference on Virtual Reality and 3D User Interfaces Abstracts and Workshops (VRW), Mar. 12-16, 2022, 2 pages.

Korean Office Action issued on Apr. 26, 2025, in connection with the Korean Patent Application No. 10-2022-0107945 with its English translation, 13 pages.

\* cited by examiner

METHOD AND DEVICE FOR ESTIMATING LOCOMOTION IN VIRTUAL REALITY

CROSS-REFERENCE TO RELATED APPLICATION

This application claims priority under 35 U.S.C. § 119 to Korean Patent Application No. 10-2022-0107945, filed on Aug. 26, 2022, in the Korean Intellectual Property Office (KIPO), the disclosure of which is incorporated by reference herein in its entirety.

TECHNICAL FIELD

The present disclosure relates to a method and device for estimating locomotion in virtual reality, and more particularly, to a method and device for estimating locomotion in virtual reality, capable of estimating a locomotion direction and/or a locomotion speed using foot pressure data of a user.

This work was supported by the GIST-MIT Research Collaboration grant funded by the GIST in 2022.

This research was supported the National Research Foundation of Korea (NRF) funded by the MIST (2021R1A4A1030075)

This research was supported by 'Project for Science and Technology Opens the Future of the Region' program through the INNOPOLIS FOUNDATION funded by Ministry of Science and ICT (Project Number: 2022-DD-UP-0312)

BACKGROUND

Recently, with the development of IT technology, various virtual reality-based services have been provided. Here, virtual reality represents a state-of-the-art technology that creates virtual spaces and objects according to human imagination with computers to allow people to experience as if it is real. For example, people may indirectly experience actions of the five senses, such as sight, hearing, and touch, through an avatar in virtual reality using a head-mounted display (HMD) and a controller.

Meanwhile, when a user of a virtual reality service wears an HMD, controller, etc. and moves in reality or gazes at a specific area, the user's motion is reflected in the virtual reality as it is. For example, a computer may recognize the user's motion in reality through the HMD and the controller and determine an avatar's motion in virtual reality using the recognized user's motion.

However, since the HMD is mounted on the user's head and the controller is held in the user's hand, it is not easy to determine the user's locomotion using the HMD and the controller. Accordingly, technologies, such as a foot mouse, a treadmill, and a leg strap have been developed to determine a user's locomotion, but these technologies limit the movement of the user's body and do not accurately reflect real-world motion.

SUMMARY

In view of the above, the present disclosure provides a method for estimating locomotion in virtual reality, and a non-transitory computer-readable medium storing instructions, and an device (system).

The present disclosure may be implemented in a variety of ways, including a method, a device (system), or a non-transitory computer-readable medium storing instructions.

The present disclosure provides a method for estimating locomotion in virtual reality performed by at least one processor, including measuring a plurality of pressure points according to a user's locomotion using a high-resolution tactile sensor including a plurality of pressure sensors, extracting a plurality of footprint images including the plurality of measured pressure points, clustering the plurality of pressure points into a first set of pressure points corresponding to a left foot and a second set of pressure points corresponding to a right foot, based on the plurality of extracted footprint images, and estimating at least a portion of a locomotion direction and a locomotion speed of the user using a first cluster corresponding to the first set of pressure points and a second cluster corresponding to the second set of pressure points.

The method may further include extracting a plurality of pressure points according to the user's locomotion by removing noise for the pressure points measured by the high-resolution tactile sensor based on a noise removal algorithm based on a normal distribution.

The performing of the clustering may include generating the first cluster and the second cluster using K-means clustering.

The estimating of at least a portion of the locomotion direction and the locomotion speed of the user may include estimating a locomotion speed of the user when a pressure point corresponding to a maximum pressure value moves from one cluster to another using the plurality of footprint images.

The estimating of the locomotion speed of the user may include estimating the locomotion speed of the user based on a time at which the pressure point corresponding to the maximum pressure value moves from one cluster to another.

The estimating of at least a portion of the locomotion direction and the locomotion speed of the user may include calculating a first center point of the first cluster and a second center point of the second cluster, and estimating the locomotion direction of the user based on a direction perpendicular to a line segment connecting the first center point to the second center point.

The estimating of at least a portion of the locomotion direction and the locomotion speed of the user may include calculating at least a portion of a length of a first footprint corresponding to the first cluster and a length of a second footprint corresponding to the second cluster, and determining whether at least the calculated portion of the length of the first footprint and the length of the second footprint is less than a predetermined reference.

The method may further include receiving a yaw value of a head-mounted display (HMD) device from the HMD device, and determining a gaze direction of the user based on the received yaw value of the HMD device, wherein the estimating of the locomotion direction of the user based on a direction perpendicular to a line segment connecting the first center point to the second center point may include estimating the locomotion direction of the user based on the determined gaze direction of the user and the direction perpendicular to the line segment connecting the first center point to the second center point.

The estimating of at least a portion of the locomotion direction and the locomotion speed of the user may include determining a direction of the first cluster and a direction of the second cluster using linear regression, and estimating the locomotion direction of the user by using an average of the determined directions of the first cluster and the second cluster.

The estimating of at least a portion of the locomotion direction and locomotion speed of the user may include calculating at least a portion of a length of a first footprint corresponding to the first cluster and a length of a second footprint corresponding to the second cluster, and determining whether at least the calculated portion of the length of the first footprint and the length of the second footprint is equal to or greater than a predetermined reference.

The method may further include receiving a yaw value of a head-mounted display (HMD) device from the HMD device, and determining a gaze direction of the user based on the received yaw value of the HMD device, wherein the determining of the locomotion direction of the user using the average of the determined directions of the first cluster and the second cluster may include estimating the locomotion direction of the user by using the determined gaze direction of the user and an average of the direction of the first cluster and the direction of the second cluster.

The present disclosure also provides a non-transitory computer-readable recording medium storing instructions for executing the method described above in a computer.

The present disclosure also provides a computing device including a communication module, a memory, and at least one processor connected to the memory and configured to execute at least one computer-readable program included in the memory. The at least one program includes instructions for measuring a plurality of pressure points according to a user's locomotion using a high-resolution tactile sensor including a plurality of pressure sensors, extracting a plurality of footprint images including the plurality of measured pressure points, clustering the plurality of pressure points into a first set of pressure points corresponding to a left foot and a second set of pressure points corresponding to a right foot, based on the plurality of extracted footprint images, and estimating at least a portion of a locomotion direction and a locomotion speed of the user using a first cluster corresponding to the first set of pressure points and a second cluster corresponding to the second set of pressure points.

Advantageous Effects

In various embodiments of the present disclosure, the computing device may fairly refer to a position in which pressure is applied using a clustering technique, and accordingly, may accurately detect the entire range of the foot.

According to various embodiments of the present disclosure, the computing device may accurately estimate a locomotion direction by inferring a direction of the user's toes even when the user's body is imbalanced or the user's feet are not properly aligned.

In various embodiments of the present disclosure, the computing device may efficiently estimate the locomotion ability of the user by using a first cluster and a second cluster generated by clustering to estimate a locomotion direction and a locomotion speed.

The effects of the present disclosure are not limited to the effects mentioned above, and other effects not mentioned above will be clearly understood by those skilled in the art (referred to as "people of ordinary skill") from the description of the claims.

DETAILED DESCRIPTION

Figure 1:
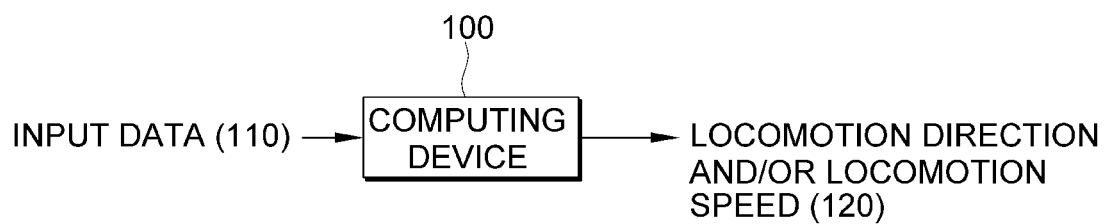
FIG. 1 is a diagram illustrating an example in which a computing device estimates locomotion in virtual reality using foot pressure data of a user, according to an embodiment of the present disclosure.

Hereinafter, specific details for the implementation of the present disclosure will be described in detail with reference to the accompanying drawings. However, in the following description, if there is a risk of unnecessarily obscuring the gist of the present disclosure, detailed descriptions of well-known functions or configurations will be omitted.

In the accompanying drawings, identical or corresponding elements are given the same reference numerals. In addition, in the description of the following embodiments, overlapping descriptions of the same or corresponding components may be omitted. However, omission of a description of a component does not intend that such a component is not included in an embodiment.

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure.

Terms to be used in the following embodiments will hereinafter be described in detail, and a detailed description of embodiments is as follows. Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

As used herein, the singular forms "a," "an," and "the" may be intended to include the plural forms as well, unless the context clearly indicates otherwise. Terms used in the following description are used only to describe the specific embodiments and are not intended to restrict the present disclosure. A singular expression may include a plural expression unless otherwise stated m context.

In the present disclosure, the terms "include," "including" and the like may indicate that features, steps, operations, elements and/or components are present, but such terms do not preclude the addition of one or more other functions, steps, operations, elements, components and/or combinations thereof.

In the present disclosure, when a specific component is referred to as "coupling," "combining," "connecting," or "reacting" to any other component, the specific component may be directly coupled to, combined with, and/or connected to, or reacted with other components, but is not limited thereto. For example, one or more intermediate components may exist between certain components and other components. Also, in the present disclosure, "and/or" may include each of one or more items listed or a combination of at least a some of one or more items.

In the present disclosure, terms, such as "first" and "second" are used to distinguish a specific component from other components, and the aforementioned components are not limited by these terms. For example, a "first" component may have the same or similar shape as a "second" component.

In the present disclosure, "K-means clustering" is one of unsupervised learning clustering unlabeled data, and may refer to an algorithm that clusters data by determining an initial center for each cluster according to the number of clusters to be classified and determining an optimal center through learning.

In the present disclosure, "linear regression" may refer to a statistical analysis method that describes or predicts the relationship between an independent variable and a dependent variable.

FIG. 1 is a diagram illustrating an example in which a computing device 100 according to an embodiment of the present disclosure estimates locomotion in virtual reality using foot pressure data 110 of a user. As shown, the computing device 100 may acquire the pressure data 110 and estimate a locomotion direction and/or locomotion speed 120 of the user. For example, a user may move on a high-resolution tactile mat including a plurality of pressure sensors, and the pressure data 110 including a plurality of pressure points may be measured and acquired according to the user's movement.

According to an embodiment, the high-resolution tactile mat may be configured by connecting 2 ft×2 ft carpet tiles including 32×32 pressure sensors, but is not limited thereto. Here, each carpet tile may be configured by arranging electrodes at right angles on each side surface of a piezoresistive film, and each pressure sensor may be located at an intersection of the electrodes aligned at right angles with each other to measure a pressure of up to 14 kPa through a change in resistance. The high-resolution tactile mat may have high spatial resolution, and since the high-resolution tactile mat is based on a modular structural design, the high-resolution tactile mat may be easily installed and expanded. In addition, the speed in virtual reality may be measured with a frame rate of about 17 Hz through the high-resolution tactile mat.

According to an embodiment, the computing device 100 may extract a plurality of footprint images including a plurality of measured pressure points. For example, the computing device 100 may extract footprint images of 14 frames to 17 frames (e.g., frames in a time interval of 0.87 seconds to 1 second) so that pressure points using both feet of the user may be acquired. Then, the computing device 100 may estimate a locomotion direction and/or locomotion speed 120 of the user using the extracted or acquired footprint image.

According to an embodiment, the computing device 100 may cluster a plurality of pressure points into a first set of pressure points corresponding to the left foot and a second set of pressure points corresponding to the right foot, based on the plurality of extracted footprint images and estimate the locomotion direction and/or locomotion speed 120 of the user by using a first cluster corresponding to the first set of pressure points and a second cluster corresponding to the second set of pressure points. That is, the computing device 100 may classify pressure points into left and right feet through clustering and estimate the locomotion direction and/or locomotion speed 120 of the user through the classified information. With this configuration, the computing device 100 may fairly refer to locations in which pressure is applied by using the clustering technique, and accordingly, may accurately detect the entire range of the foot.

Figure 2:
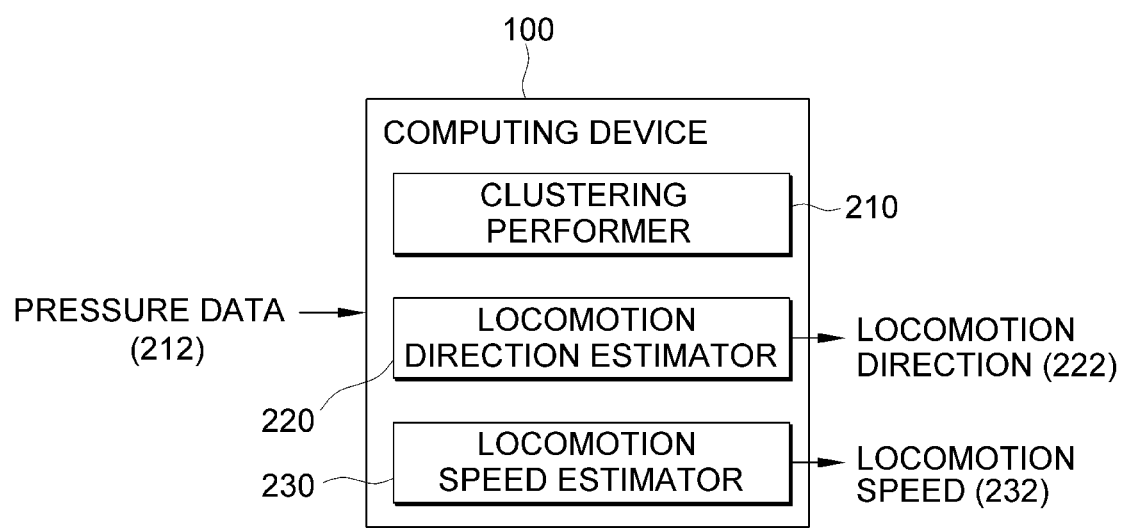
FIG. 2 is a functional block diagram illustrating an internal configuration of a computing device according to an embodiment of the present disclosure.

FIG. 2 is a functional block diagram illustrating an internal configuration of the computing device 100 according to an embodiment of the present disclosure. As shown, the computing device 100 may include a clustering performer 210, a locomotion direction estimator 220, a locomotion speed estimator 230, and the like. As described above, the computing device 100 may communicate with the high-resolution tactile mat and acquire or measure pressure data 212 necessary for estimating a locomotion direction and/or a locomotion speed in real time.

According to an embodiment, the computing device 100 may measure a plurality of pressure points according to the user's locomotion by using the high-resolution tactile sensor including a plurality of pressure sensors. Here, the pressure point may include, but is not limited to, a position and/or a size of pressure according to the user's locomotion. Also, the computing device 100 may extract a plurality of footprint images including a plurality of measured pressure points. As described above, the plurality of footprint images may include images of 14 to 17 frames, but are not limited thereto.

Additionally, the computing device 100 may extract a plurality of pressure points according to the user's locomotion by removing noise for the pressure points measured by the high-resolution tactile sensor based on a noise removal algorithm based on a normal distribution. For example, an existing tactile sensor has a problem in that it is difficult to accurately measure the user's foot pressure due to excessive noise, but the computing device 100 may determine whether a portion detected as pressure is actual pressure or noise by using the distribution of the entire pressure image. Through this analysis, a plurality of clear pressure points without noise may be extracted.

The clustering performer 210 may cluster the plurality of pressure points into a first set of pressure points corresponding to the left foot and a second set of pressure points corresponding to the right foot, based on the plurality of extracted footprint images. For example, the clustering performer 210 may generate a first cluster and a second cluster using K-means clustering, but is not limited thereto. When clustering is performed in this manner, exact positions and ranges of the left and right feet may be specified.

Meanwhile, when the left foot and the right foot are distinguished from each other using the sum or mean of footprint images without using clustering, a problem of not reflecting the user's locomotion characteristics, such as strongly use of the balls of the foot or strongly use of the heel, and as a result, it may be difficult to accurately specify the position and range of the foot. In contrast, in the case of using clustering, there is an advantage in that the entire foot may be precisely detected because the position to which pressure is applied is fairly referenced.

According to an embodiment, the locomotion direction estimator 220 may calculate a direction of the user's movement based on the first cluster corresponding to the left foot and the second cluster corresponding to the right foot. For example, the locomotion direction estimator 220 may determine a direction of the first cluster and a direction of the second cluster by using a linear regression algorithm. Here, the direction of the cluster may refer to a direction in which the tiptoe faces in a sole image. In order to determine the direction of the cluster, the locomotion direction estimator 220 may first determine a longer portion and a shorter portion of the cluster, and if the longer portion and the shorter portion show a difference greater than or equal to a predetermined reference, the locomotion direction estimator 220 may determine the direction of the cluster through the linear regression algorithm.

Thereafter, the locomotion direction estimator 220 may estimate the locomotion direction 222 of the user by using an average of the determined direction of the first cluster and the direction of the second cluster. That is, the locomotion direction estimator 220 may estimate an intermediate angle of the direction in which both tiptoes face as the locomotion direction (e.g., a heading direction) 222 of the user. With this configuration, the locomotion direction estimator 220 may accurately estimate the locomotion direction 222 by inferring the direction of the user's tiptoes even when the user's body is unbalanced or the feet are not properly aligned.

Additionally or alternatively, the locomotion direction estimator 220 may calculate a first center point of the first cluster, calculate a second center point of the second cluster, and then estimate the locomotion direction 222 of the user based on a direction perpendicular to a line segment connecting the first center point to the second center point. For example, the locomotion direction estimator 220 may determine a longer portion and a shorter portion of the cluster, and when the longer portion and the shorter portion do not have a difference greater than or equal to a predetermined reference, the locomotion direction estimator 220 may estimate the locomotion direction 222 of the user using the center point of each cluster.

According to an embodiment, the locomotion speed estimator 230 may estimate the locomotion speed 232 of the user when a pressure point corresponding to a maximum pressure value moves from one cluster to another using a plurality of footprint images. In addition, when the pressure point corresponding to the maximum pressure value does not move, the locomotion direction estimator 220 may estimate that the locomotion speed 232 of the user is zero.

The locomotion speed estimator 230 may determine that the stepping foot is changed when the pressure point corresponding to the maximum pressure value is changed from the first cluster to the second cluster or from the second cluster to the first cluster. Then, the locomotion speed estimator 230 may estimate or calculate the locomotion speed 232 at which the user walks or runs by measuring the time interval between the time when the foot is switched and the current time. That is, the locomotion speed estimator 230 may continuously track the position and range of each foot based on the clusters classified by the clustering performer 210, and accordingly, the locomotion direction estimator 220 may precisely estimate the locomotion speed 232 of the user based on a change in the stepping foot.

In FIG. 2, each functional configuration included in the computing device 100 is separately described, but this is only to help understanding of the present disclosure, and one computing device may perform two or more functions. With this configuration, the computing device 100 may efficiently estimate the locomotion ability of the user by using the first cluster and the second cluster generated by clustering to estimate the locomotion direction and locomotion speed.

Figure 3:
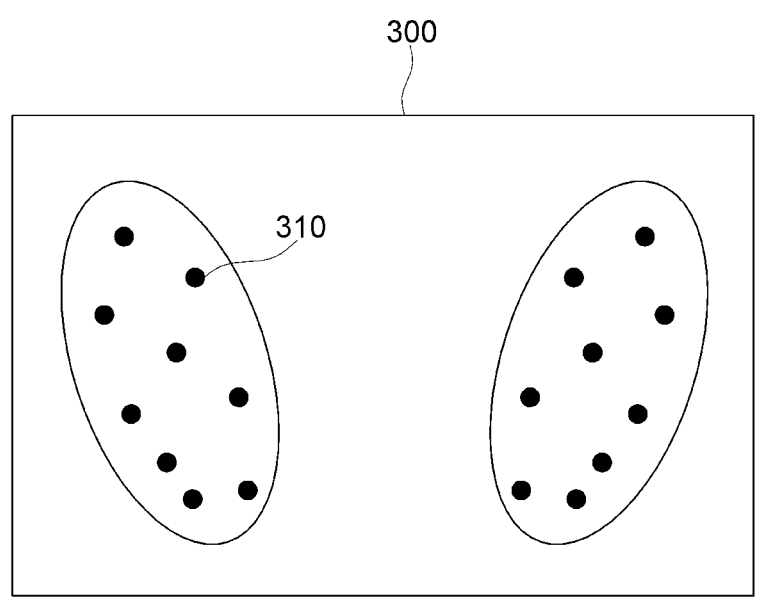
FIG. 3 is a diagram illustrating an example of a footprint image according to an embodiment of the present disclosure.

FIG. 3 is a diagram illustrating an example of a footprint image 300 according to an embodiment of the present disclosure. As shown, the footprint image 300 may include a plurality of pressure points 310. Here, each pressure point 310 may include information on the position and size of the user's foot pressure.

As described above, the pressure points 310 may be generated or acquired when the user moves on the high-resolution tactile sensor, and the pressure points 310 acquired thusly may be extracted in units of frames to determine the footprint image 300. That is, one footprint image 300 may include user's foot pressure data corresponding to a specific frame time interval.

Figure 4:
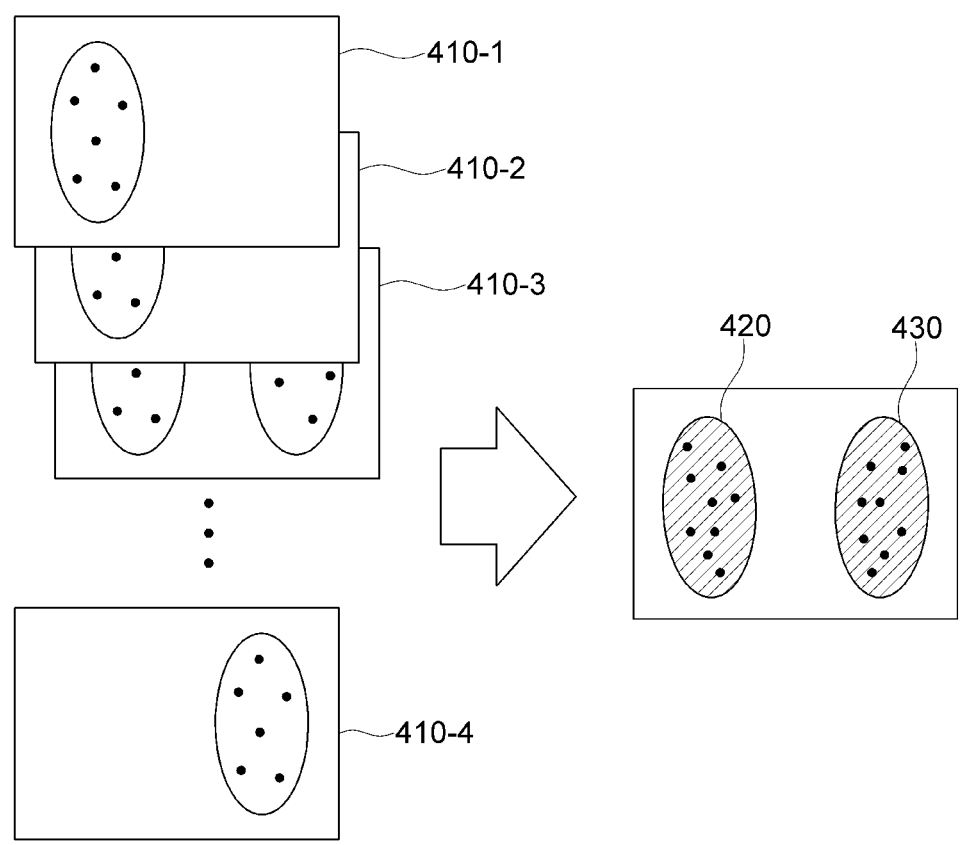
FIG. 4 is a diagram illustrating an example of performing clustering on pressure points according to an embodiment of the present disclosure.

FIG. 4 is a diagram illustrating an example of performing clustering on pressure points according to an embodiment of the present disclosure. As described above, the computing device (100 in FIG. 1) may measure a plurality of pressure points according to the user's locomotion using a high-resolution tactile sensor including a plurality of pressure sensors and extract a plurality of footprint images 410_1, 410_2, 410_3, and 410_4 including the plurality of measured pressure points. For example, the computing device may extract the plurality of footprint images 410_1, 410_2, 410_3, and 410_4 during a specific frame time period.

According to an embodiment, the computing device may cluster the plurality of pressure points into a first set of pressure points corresponding to the left foot and a second set of pressure points corresponding to the right foot based on the plurality of extracted footprint images 410_1, 410_2, 410_3, and 410_4 to generate a first cluster 420 corresponding to the first set of pressure points and a second cluster 430 corresponding to the second set of pressure points.

According to an embodiment, the computing device may generate the first cluster 420 and the second cluster 430 using K-means clustering. Here, K-means clustering, one of unsupervised learning that clusters unlabeled data, may refer to an algorithm that clusters data by determining an initial center for each cluster according to the number of clusters to be classified and determining an optimal center through learning. The first cluster 420 and the second cluster 430 generated thusly may be used to determine or estimate a locomotion direction and locomotion speed of the user in virtual reality.

Although the shapes of the first cluster 420 and the second cluster 430 are illustrated as being elliptical in FIG. 4, this is for understanding of the present disclosure, and the shape of the cluster may be determined to be similar to the shape of the user's foot. In addition, although K-means clustering is described with reference to FIG. 4, the present disclosure is not limited thereto, and any other clustering technique may also be used.

Figure 5:
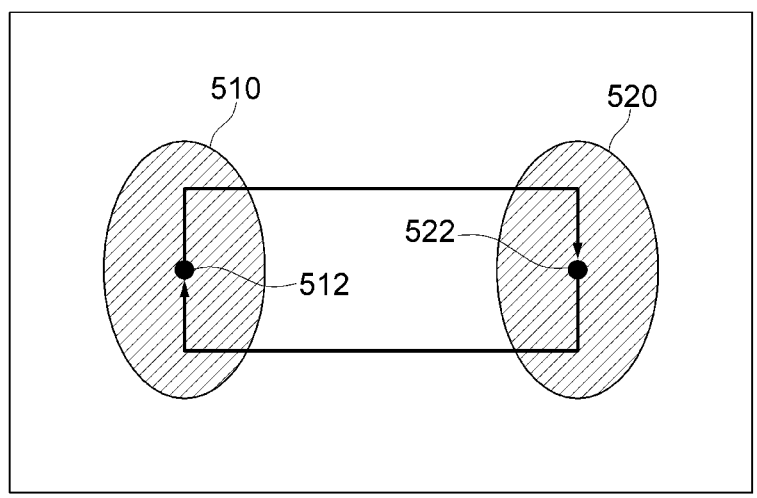
FIG. 5 is a diagram illustrating an example of estimating a locomotion speed of a user according to an embodiment of the present disclosure.

FIG. 5 is a diagram illustrating an example of estimating a locomotion speed of a user according to an embodiment of the present disclosure. As described above with reference to FIG. 4, the computing device (100 in FIG. 1) may generate a first cluster 510 corresponding to the user's left foot and a second cluster 520 corresponding to the user's right foot. A locomotion speed of the user may be determined or estimated through the clusters 510 and 520 generated thusly.

According to an embodiment, the computing device may track a pressure point corresponding to a maximum pressure value in a footprint image of a specific frame input in real time. For example, a pressure point 512 corresponding to the maximum pressure value in a specific frame may be included in the first cluster 510. Also, a pressure point 522 corresponding to a maximum pressure value in another specific frame following the specific frame may be included in the second cluster 520. That is, the computing device may determine the foot the user is currently stepping on based on the maximum pressure value, and track the movement of a pressure point corresponding to the maximum pressure value from one cluster to another cluster to estimate that the foot the user is stepping on has changed.

According to an embodiment, the computing device may estimate the user's locomotion speed based on a time at which the pressure point corresponding to the maximum pressure value moves from one cluster to another. For example, the computing device may estimate the user's locomotion speed using Equation 1 below.

$$S=(I_u-I_c) \times \text{speed}_{standard}(I_c \leq I_u)$$ [Equation 1]

Here, S denotes the user's locomotion speed, and Iu denotes a reference time interval. In addition, Ic may denote a time interval at which the pressure point corresponding to the maximum pressure value moves from one cluster to another, and $\text{speed}_{standard}$ may represent a predetermined standard speed. Here, when Ic is greater than Iu, the user's locomotion speed may be determined to be zero.

Figure 6:
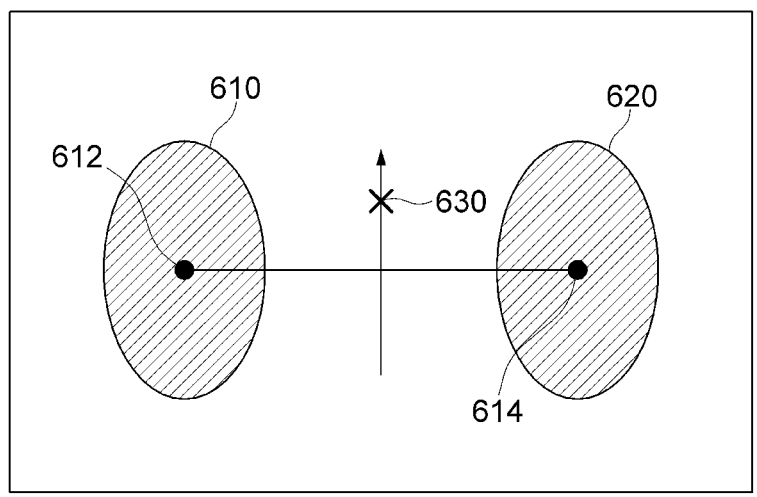
FIG. 6 is a diagram illustrating an example of estimating a locomotion direction of a user using a center point according to an embodiment of the present disclosure.

FIG. 6 is a diagram illustrating an example of estimating a locomotion direction of a user using center points 612 and 614 according to an embodiment of the present disclosure. As described above with reference to FIG. 4, the computing device (100 in FIG. 1) may generate a first cluster 610 corresponding to the user's left foot and a second cluster 620 corresponding to the user's right foot. A locomotion direction of the user may be determined or estimated through the clusters 610 and 620 generated thusly.

According to an embodiment, the computing device may calculate the first center point 612 of the first cluster 610 and the second center point 622 of the second cluster 620. Also, the computing device may estimate the locomotion direction of the user based on a direction perpendicular to a line segment connecting the first center point 612 to the second center point 622. That is, the computing device may estimate or determine a direction perpendicular to the line segment connecting the left foot to the right foot as the locomotion direction of the user. For example, the locomotion direction of the user may be calculated by Equations 2 and 3 below.

$$DS = -\frac{C1_x - C2_x}{C1_y - C2_y}$$ [Equation 2]

Here, DS may denote a directional slope, C1x-C2x may denote a difference between an x coordinate of the first center point 612 and an x coordinate of the second center point 614, and C1y-C2y may denote a difference between a y coordinate of the first center point 612 and a y coordinate of the second center point 614.

$$D=\arctan(DS) \text{ or } D=\arctan(DS)-180$$ [Equation 3]

Here, D denotes the locomotion direction of the user, and arctan(DS) denotes an arctangent value of DS. For example, the computing device may receive a yaw value of an HMD device from the HMD device and determine a gaze direction 630 of the user based on the received yaw value of the HMD device. Thereafter, the computing device may estimate a locomotion direction of the user based on the determined gaze direction 630 of the user and a direction perpendicular to a line segment connecting the first center point 612 to the second center point 622. Here, based on the yaw value of the HMD device, when a difference between arctan(DS) and the yaw value of the HMD device is within 90, the locomotion direction of the user may be determined as arctan(DS), and when the difference between arctan(DS) and the yaw value of the HMD device is greater than 90, the locomotion direction of the user may be determined as arctan(DS)-180. That is, it may be assumed that the user's head rotation is not greater than 90 degrees.

The computing device may calculate at least a portion of the length of the first footprint corresponding to the first cluster 610 and the length of the second footprint corresponding to the second cluster 620 and determine whether at least the calculated portion of the lengths of the first and second footprints is less than a predetermined reference. In addition, the computing device may determine the locomotion direction of the user by the method described above with reference to FIG. 6 when at least the calculated portion of the lengths of the first and second footprints is less than the predetermined reference. In other words, the computing device may determine the locomotion direction of the user through the method described above with reference to FIG. 6 even when the shape of the user's footprint is unclear.

Figure 7:
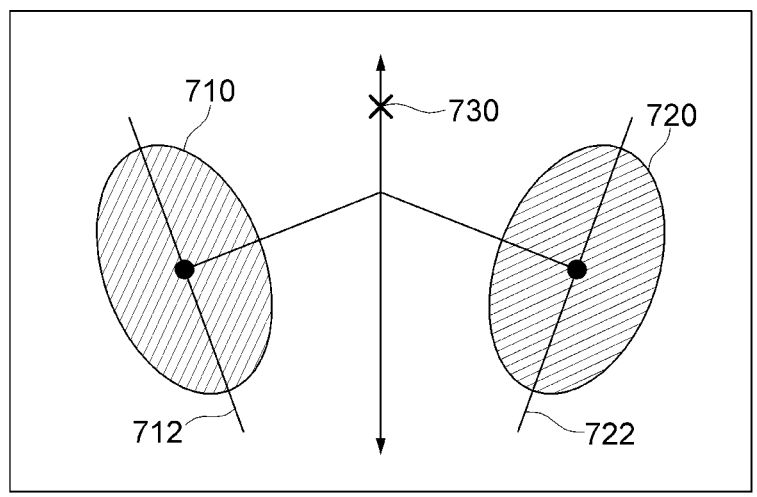
FIG. 7 is a diagram illustrating an example of estimating a locomotion direction of a user using linear regression according to an embodiment of the present disclosure.

FIG. 7 is a diagram illustrating an example of estimating a locomotion direction of a user using linear regression according to an embodiment of the present disclosure. As described above with reference to FIG. 4, the computing device (100 in FIG. 1) may generate a first cluster 710 corresponding to the user's left foot and a second cluster 720 corresponding to the user's right foot. A locomotion direction of the user may be determined or estimated through the clusters 710 and 720 generated thusly.

According to an embodiment, the computing device may determine a direction of the first cluster 710 and a direction of the second cluster 720 using linear regression, and estimate the locomotion direction of the user using an average of the determined directions of the first cluster 710 and the second cluster 720. For example, when the direction of the first cluster 710 and the direction of the second cluster 720 are significantly extracted, a directional slope DS may be calculated by Equation 4 below.

$$DS=(S1+S2)/2$$ [Equation 4]

Here, DS may denote a directional slope. In addition, S1 may denote a slope 712 calculated by applying a linear regression algorithm to the first cluster 710, and S2 may denote a slope 722 calculated by applying the linear regression algorithm to the second cluster 720.

Thereafter, the locomotion direction of the user may be calculated by Equation 3 described above with reference to FIG. 6. According to an embodiment, the computing device may receive a yaw value of the HMD device from the HMD device and determine a gaze direction 730 of the user based on the received yaw value of the HMD device. Thereafter, the computing device may estimate the locomotion direction of the user by using an average of the determined gaze direction 730 of the user, the direction of the first cluster 710, and the direction of the second cluster 720. Here, based on the yaw value of the HMD device, when a difference between arctan(DS) and the yaw value of the HMD device is within 90, the locomotion direction of the user may be determined as arctan(DS), and when the difference between arctan(DS) and the yaw value of the HMD device is greater than 90, the locomotion direction of the user may be determined as arctan(DS)−180. That is, it may be assumed that the user's head rotation is not greater than 90 degrees.

According to an embodiment, the computing device may calculate at least a portion of the length of the first footprint corresponding to the first cluster 710 and the length of the second footprint corresponding to the second cluster 720 and determine whether at least the calculated portion of the lengths of the first footprint and the second footprint is equal to or greater than a predetermined reference. In addition, the computing device may determine the locomotion direction of the user by the method described above with reference to FIG. 7 when at least the calculated portion of the lengths of the first and second footprints is equal to or greater than the predetermined reference.

Figure 8:
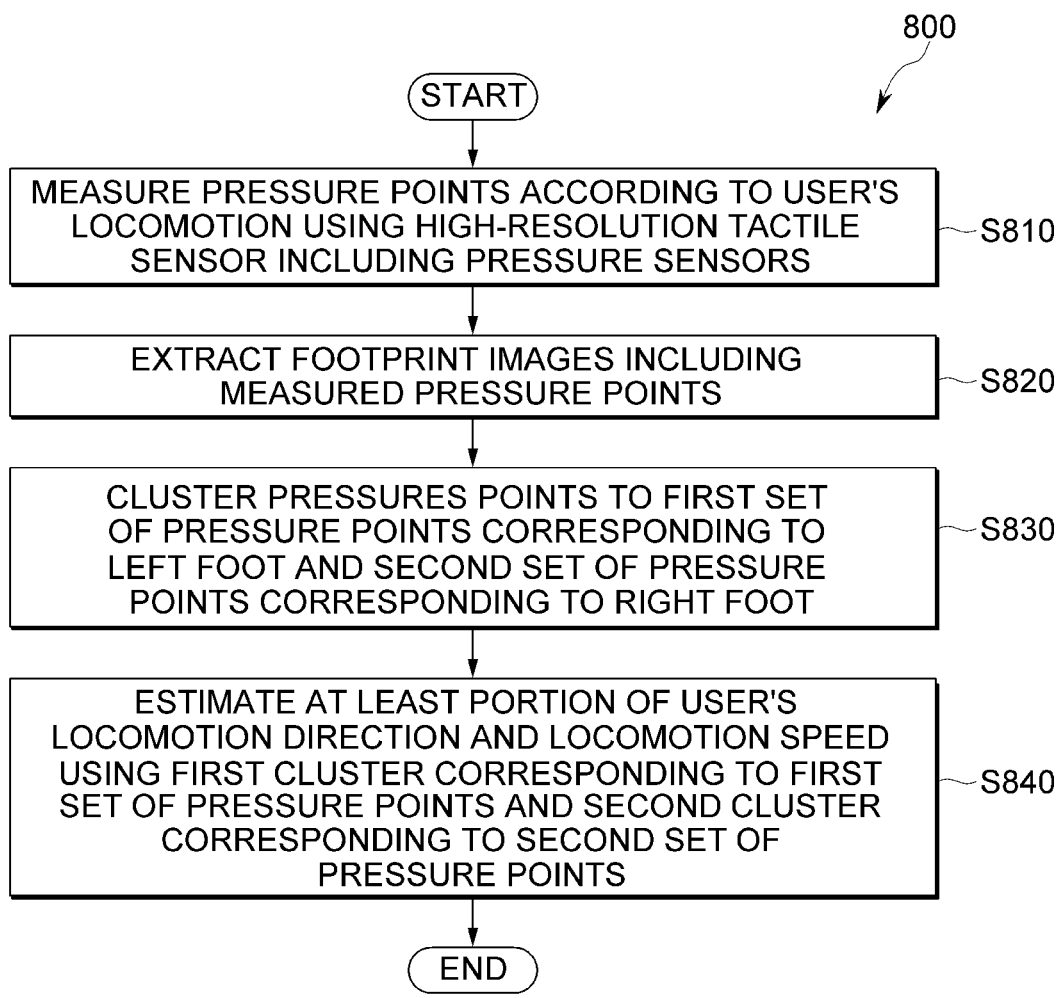
FIG. 8 is a flowchart illustrating an example of a method for estimating locomotion in virtual reality according to an embodiment of the present disclosure.

FIG. 8 is a flowchart illustrating an example of a method 800 for estimating locomotion in virtual reality according to an embodiment of the present disclosure. The method 800 for estimating locomotion in virtual reality may be performed by at least one processor (e.g., at least one processor of a computing device). The method 800 for estimating locomotion in virtual reality may be initiated by a processor measuring a plurality of pressure points according to the user's locomotion using a high-resolution tactile sensor including a plurality of pressure sensors (S810). For example, the processor may extract a plurality of pressure points according to the user's locomotion by removing noise for the pressure points measured by the high-resolution tactile sensor based on a noise removal algorithm based on a normal distribution.

The processor may extract a plurality of footprint images including the plurality of measured pressure points (S820). Also, the processor may cluster the plurality of pressure points into a first set of pressure points corresponding to the left foot and a second set of pressure points corresponding to the right foot, based on the plurality of extracted footprint images (S830). For example, the processor may generate a first cluster and a second cluster using K-means clustering.

The processor may estimate at least a portion of a locomotion direction and locomotion speed of the user by using the first cluster corresponding to the first set of pressure points and the second cluster corresponding to the second set of pressure points (S840). According to an embodiment, the processor may estimate a locomotion speed of the user when a pressure point corresponding to a maximum pressure value moves from one cluster to another using the plurality of footprint images. For example, the processor may estimate the locomotion speed of the user based on a time at which the pressure point corresponding to the maximum pressure value moves from one cluster to another.

Additionally or alternatively, the processor may calculate a first center point of the first cluster, calculate a second center point of the second cluster, and estimate a locomotion direction of the user based on a direction perpendicular to a line segment connecting the first center point to the second center point. Also, the processor may receive a yaw value of the HMD device from the HMD device and determine a gaze direction of the user based on the received yaw value of the HMD device. In this case, the processor may estimate the locomotion direction of the user based on the determined gaze direction of the user and a direction perpendicular to a line segment connecting the first center point to the second center point.

Additionally or alternatively, the processor may determine a direction of the first cluster and a direction of the second cluster using linear regression and estimate the locomotion direction of the user using an average of the determined directions of the first cluster and the second cluster. Also, the processor may receive a yaw value of the HMD device from the HMD device and determine a gaze direction of the user based on the received yaw value of the HMD device. In this case, the processor may estimate the locomotion direction of the user by using an average of the determined gaze direction of the user, the direction of the first cluster, and the direction of the second cluster.

According to an embodiment, the processor may calculate at least a portion of the length of the first footprint corresponding to the first cluster and the length of the second footprint corresponding to the second cluster and determine whether at least the calculated portion of the length of the first footprint and the length of the second footprint is equal to or greater than a predetermined reference. As a result of the determination, when at least the calculated portion of the length of the first footprint and the length of the second footprint is equal to or greater than the predetermined reference, the processor may estimate the locomotion direction of the user using a linear regression technique, and when at least the calculated portion of the length of the first footprint and the length of the second footprint is less than the predetermined reference, the processor may estimate the locomotion direction of the user by using a line segment connecting the center points of the clusters, but is not limited thereto.

Figure 9:
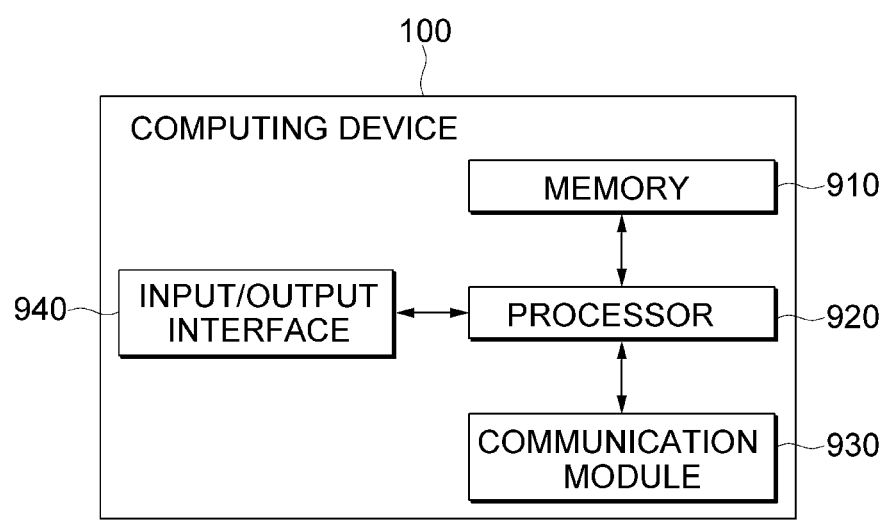
FIG. 9 is a block diagram illustrating an internal configuration of a computing device according to an embodiment of the present disclosure.

FIG. 9 is a block diagram illustrating an internal configuration of the computing device 100 according to an embodiment of the present disclosure. The computing device 100 may include a memory 910, a processor 920, a communication module 930 and an input/output interface 940. As shown in FIG. 9, the computing device 100 may be configured to communicate information and/or data via a network using the communication module 930.

The memory 910 may include any non-transitory computer-readable storage medium. According to an embodiment, the memory 910 may include a permanent mass storage device, such as a random access memory (RAM), a read-only memory (ROM), a disk drive, a solid state drive (SSD), a flash memory, and the like. As another example, the permanent mass storage device, such as the ROM, the SSD, the flash memory, or the disk drive may be included in the computing device 100 as a separate permanent storage device separate from the memory 910. Also, an operating system and at least one program code may be stored in the memory 910.

These software components may be loaded from a computer-readable recording medium separate from the memory 910. The computer-readable recording medium may include a recording medium directly connectable to the computing device 100, for example, a computer-readable recording medium, such as a floppy drive, a disk, a tape, a DVD/CD-ROM drive, and a memory card. As another example, software components may be loaded into the memory 910 through the communication module 930 rather than a computer-readable recording medium. For example, at least one program may be loaded into the memory 910 based on a computer program installed by files provided by developers or a file distribution system that distributes application installation files through the communication module 930.

The processor 920 may be configured to process commands of a computer program by performing basic arithmetic, logic, and input/output operations. The commands may be provided to a user terminal (not shown) or other external system by the memory 910 or the communication module 930.

The communication module 930 may provide a configuration or function for a user terminal (not shown) and the computing device 100 to communicate with each other through a network, and may provide a configuration or function for the computing device 100 to communicate with an external system (e.g., a separate cloud system, etc.). For example, control signals, commands, data, etc. provided under the control of the processor 920 of the computing device 100 may be transmitted to a user terminal and/or an external system through a communication module of the user terminal and/or the external system via a communication module 930 and a network.

Also, the input/output interface 940 of the computing device 100 may be a unit for interfacing with a device (not shown) for inputting or outputting that may be connected to the computing device 100 or that may be included in the computing device 100. In FIG. 9, the input/output interface 940 is illustrated as an element configured separately from the processor 920, but the present disclosure is not limited thereto, and the input/output interface 940 may be included in the processor 920. The computing device 100 may include more components than those of FIG. 9. However, there is no need to clearly show most of the related art components.

The processor 920 of the computing device 100 may be configured to manage, process, and/or store information and/or data received from a plurality of user terminals and/or a plurality of external systems.

The aforementioned methods and/or various embodiments may be realized by digital electronic circuits, computer hardware, firmware, software, and/or combinations thereof. Various embodiments of the present disclosure may be implemented by a data processing device, for example, one or more programmable processors and/or one or more computing devices or by a computer-readable recording medium and/or a computer program stored in the computer-readable recording medium. The aforementioned computer program may be written in any form of programming language, including compiled or interpreted languages, and may be distributed in any form, such as a stand-alone program, module, or subroutine. The computer program may be distributed over one computing device, multiple computing devices connected through the same network, and/or multiple computing devices distributed to be connected through multiple different networks.

The methods and/or various embodiments described above may be performed by one or more processors configured to execute one or more computer programs that process, store, and/or manage certain functions, functions, or the like, by operating based on input data or generating output data. For example, the method and/or various embodiments of the present disclosure may be performed by a special purpose logic circuit, such as a field programmable gate array (FPGA) or an application specific integrated circuit (ASIC), and a device and/or system for performing the method and/or embodiments of the present disclosure may be implemented as a special purpose logic circuit, such as an FPGA or an ASIC.

One or more processors executing the computer program may include a general purpose or special purpose microprocessor and/or one or more processors of any kind of digital computing device. The processor may receive instructions and/or data from each of a read-only memory and a random access memory or receive instructions and/or data from the read-only memory and the random access memory. In the present disclosure, components of a computing device performing methods and/or embodiments may include one or more processors for executing instructions and one or more memory devices for storing instructions and/or data.

According to an embodiment, a computing device may exchange data with one or more mass storage devices for storing data. For example, the computing device may receive data from and/or transfer data to a magnetic or optical disc. A computer-readable storage medium suitable for storing instructions and/or data associated with a computer program may include, but is not limited to, any type of non-volatile memory, including semiconductor memory devices, such as erasable programmable read-only memory (EPROM), electrically erasable PROM (EEPROM), and a flash memory device. For example, the computer-readable storage medium may include magnetic disks, such as internal hard disks or removable disks, magneto-optical disks, CD-ROM and DVD-ROM disks.

To provide interaction with a user, a computing device may include, but is not limited to, a display device (e.g., a cathode ray tube (CRT), a liquid crystal display (LCD), etc.) for providing information to a user or displaying information, and a pointing device (e.g., a keyboard, a mouse, a trackball, etc.) through which a user may provide input and/or commands, etc., on the computing device. That is, the computing device may further include any other type of devices for providing interaction with a user. For example, the computing device may provide any form of sensory feedback including visual feedback, auditory feedback, and/or tactile feedback to a user for interaction with the user. In this regard, the user may provide input to the computing device through various gestures, such as sight, voice, and motion.

In the present disclosure, various embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

A computing device based on the example embodiments described herein may be implemented using hardware and/or software configured to interact with a user, including a user device, user interface (UI) device, a user terminal, or a client device. For example, the computing device may include a portable computing device, such as a laptop computer. Additionally or alternatively, the computing device may include, but are not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with a user. Further, the computing device may include a portable communication device (e.g., a mobile phone, a smartphone, a wireless cellular phone, etc.) suitable for wireless communication over a network, such as a mobile communication network. The computing device may be configured to communicate wirelessly with a network server using wireless communication technologies and/or protocols, such as radio frequency (RF), microwave frequency (MWF), and/or infrared ray frequency (IRF).

The various embodiments herein, including specific structural and functional details, are examples. Accordingly, the embodiments of the present disclosure are not limited to those described above and may be implemented in various other forms. In addition, terms used in the present disclosure are for describing some embodiments and are not construed as limiting the embodiments. For example, the singular and the above may be construed to include the plural as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related technology.

Although the present disclosure has been described in relation to some embodiments in this specification, various modifications and changes may be made without departing from the scope of the present disclosure that may be understood by those skilled in the art. Moreover, such modifications and variations are intended to fall within the scope of the claims appended hereto.

What is claimed is:

1. A method for estimating locomotion in virtual reality performed by at least one processor, the method comprising:
    measuring a plurality of pressure points according to a user's locomotion using a high-resolution tactile sensor including a plurality of pressure sensors;
    extracting a plurality of footprint images including the plurality of measured pressure points;
    clustering the plurality of pressure points into a first set of pressure points corresponding to a left foot and a second set of pressure points corresponding to a right foot, based on the plurality of extracted footprint images; and
    estimating at least a portion of a locomotion direction and a locomotion speed of the user using a first cluster corresponding to the first set of pressure points and a second cluster corresponding to the second set of pressure points,
    wherein the estimating of at least a portion of the locomotion direction and the locomotion speed of the user includes estimating the locomotion speed of the user when a pressure point corresponding to a maximum pressure value moves from one cluster to an other cluster using the plurality of footprint images.

2. The method of claim 1, further comprising extracting the plurality of pressure points according to the user's locomotion by removing noise for the pressure points measured by the high-resolution tactile sensor based on a noise removal algorithm based on a normal distribution.

3. The method of claim 1, wherein the performing of the clustering includes generating the first cluster and the second cluster using K-means clustering.

4. The method of claim 1, wherein the estimating of the locomotion speed of the user includes estimating the locomotion speed of the user based on a time at which the pressure point corresponding to the maximum pressure value moves from the one cluster to the other cluster.

5. The method of claim 1, wherein
    the estimating of at least a portion of the locomotion direction and the locomotion speed of the user includes:
    calculating a first center point of the first cluster and a second center point of the second cluster; and
    estimating the locomotion direction of the user based on a direction perpendicular to a line segment connecting the first center point to the second center point.

6. The method of claim 5, wherein
    the estimating of at least a portion of the locomotion direction and the locomotion speed of the user includes:
    calculating at least a portion of a length of a first footprint corresponding to the first cluster and a length of a second footprint corresponding to the second cluster; and
    determining whether at least the calculated portion of the length of the first footprint and the length of the second footprint is less than a predetermined reference.

7. The method of claim 5, further comprising:
    receiving a yaw value of a head-mounted display (HMD) device from the HMD device; and
    determining a gaze direction of the user based on the received yaw value of the HMD device,
    wherein the estimating of the locomotion direction of the user based on a direction perpendicular to a line segment connecting the first center point to the second center point includes estimating the locomotion direction of the user based on the determined gaze direction of the user and the direction perpendicular to the line segment connecting the first center point to the second center point.

8. The method of claim 1, wherein
    the estimating of at least a portion of the locomotion direction and the locomotion speed of the user includes:
    determining a direction of the first cluster and a direction of the second cluster using linear regression; and
    estimating the locomotion direction of the user by using an average of the determined directions of the first cluster and the second cluster.

9. The method of claim 8, wherein
    the estimating of at least a portion of the locomotion direction and locomotion speed of the user includes:
    calculating at least a portion of a length of a first footprint corresponding to the first cluster and a length of a second footprint corresponding to the second cluster; and
    determining whether at least the calculated portion of the length of the first footprint and the length of the second footprint is equal to or greater than a predetermined reference.

10. The method of claim 8, further comprising:
    receiving a yaw value of a head-mounted display (HMD) device from the HMD device; and
    determining a gaze direction of the user based on the received yaw value of the HMD device,
    wherein the determining of the locomotion direction of the user using the average of the determined directions of the first cluster and the second cluster includes estimating the locomotion direction of the user by using the determined gaze direction of the user and an average of the direction of the first cluster and the direction of the second cluster.

11. A non-transitory computer-readable recording medium storing instructions for execution by one or more processors that, when executed by the one or more processors, cause the one or more processors to perform the method according to claim 1.

12. A computing device comprising:
    a communication module;
    a memory; and
    at least one processor connected to the memory and configured to execute at least one computer-readable program included in the memory,
    wherein the at least one computer-readable program includes instructions for measuring a plurality of pressure points according to a user's locomotion using a high-resolution tactile sensor including a plurality of pressure sensors, extracting a plurality of footprint images including the plurality of measured pressure points, clustering the plurality of pressure points into a first set of pressure points corresponding to a left foot and a second set of pressure points corresponding to a right foot, based on the plurality of extracted footprint images, estimating at least a portion of a locomotion direction and a locomotion speed of the user using a first cluster corresponding to the first set of pressure points and a second cluster corresponding to the second set of pressure points, and estimating the locomotion speed of the user when a pressure point corresponding to a maximum pressure value moves from one cluster to an other cluster using the plurality of footprint images.

* * * * *